(12) United States Patent
Schleinitz

(10) Patent No.: US 9,868,186 B2
(45) Date of Patent: Jan. 16, 2018

(54) METHOD FOR MACHINING A SURFACE REGION OF A ROLLING BEARING RING, AND ROLLING BEARING RING AND ROLLING BEARING

(71) Applicant: AKTIEBOLAGET SKF, Göteborg (SE)

(72) Inventor: Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 67 days.

(21) Appl. No.: 14/652,981

(22) PCT Filed: Dec. 11, 2013

(86) PCT No.: PCT/EP2013/076248
§ 371 (c)(1),
(2) Date: Jun. 17, 2015

(87) PCT Pub. No.: WO2014/095527
PCT Pub. Date: Jun. 26, 2014

(65) Prior Publication Data
US 2015/0343597 A1    Dec. 3, 2015

(30) Foreign Application Priority Data

Dec. 17, 2012 (DE) .................. 10 2012 223 475
Mar. 11, 2013 (EP) .................... 13158578

(51) Int. Cl.
B24B 39/04    (2006.01)
B23P 15/00    (2006.01)
(Continued)

(52) U.S. Cl.
CPC ............... *B24B 39/04* (2013.01); *B23P 9/02* (2013.01); *B23P 15/003* (2013.01);
(Continued)

(58) Field of Classification Search
CPC .... B23P 9/00; B23P 9/02; B23P 9/025; B23P 15/003; B24B 39/02; B24B 39/04;
(Continued)

(56) References Cited

U.S. PATENT DOCUMENTS 2,442,009 A * 5/1948 Kline ................. B24B 39/026
                                                     248/200
3,696,483 A    10/1972 Burk
(Continued)

FOREIGN PATENT DOCUMENTS

DE     10200717800 A1    10/2007
EP         1505306 A1     2/2005
GB          953797 A      4/1964

*Primary Examiner* — Christopher Besler
*Assistant Examiner* — Matthew P Travers
(74) *Attorney, Agent, or Firm* — Bryan Peckjian; SKF USA Inc. Patent Dept.

(57) ABSTRACT

A method for chipless machining of a surface region of a rolling-element bearing ring includes rotating the rolling-element bearing ring relative to a first tool having a first tool tip and a second tool having a second tool tip, positioning the first and second tool tips at start positions at first and second opposite axial ends of the surface region, and moving the first and second tools in opposite axial directions such that the first tool tip follows a first helical or spiral path on the surface region and the second tool tip follows a second helical or spiral path on the surface region, the first and second paths crossing at multiple points within an overlap region located between axial ends of the surface regions.

17 Claims, 5 Drawing Sheets

(51) Int. Cl.
  *B23P 9/02* (2006.01)
  *F16C 33/58* (2006.01)
  *F16C 33/64* (2006.01)
  *F16C 19/36* (2006.01)
  *F16C 19/26* (2006.01)

(52) U.S. Cl.
  CPC .......... *B24B 39/045* (2013.01); *F16C 33/583* (2013.01); *F16C 33/585* (2013.01); *F16C 33/64* (2013.01); *F16C 19/26* (2013.01); *F16C 19/364* (2013.01); *F16C 2223/02* (2013.01); *F16C 2223/04* (2013.01); *F16C 2240/12* (2013.01); *F16C 2240/26* (2013.01); *Y10T 29/47* (2015.01); *Y10T 29/49707* (2015.01)

(58) Field of Classification Search
  CPC ..... B24B 39/045; Y10T 29/47; Y10T 29/476; Y10T 29/49707; Y10T 29/49636; Y10T 29/49643; Y10T 29/49679; Y10T 29/49689; Y10T 29/49691; F16C 2223/02; F16C 2223/06; F16C 33/30; F16C 33/38; F16C 33/46; F16C 33/58; F16C 33/64
  See application file for complete search history.

(56) References Cited

U.S. PATENT DOCUMENTS 8,607,676 B2 * 12/2013 Ivan ..................... B23D 21/02
                                                    29/90.01
2009/0307886 A1   12/2009 Chiba et al.

* cited by examiner

METHOD FOR MACHINING A SURFACE REGION OF A ROLLING BEARING RING, AND ROLLING BEARING RING AND ROLLING BEARING

CROSS-REFERENCE

This application is the U.S. National Stage of International Application No. PCT/EP2013/076248 filed on Dec. 11, 2013, which claims priority to German patent application no. 10 2012 223 475.6 filed on Dec. 17, 2012.

TECHNOLOGICAL FIELD

The invention relates to a method for chipless machining of a surface region of a rolling-element bearing. Furthermore, the invention relates to a rolling-element bearing ring and a rolling-element bearing.

BACKGROUND

It is already known to press a sliding or rolling tool tip, which is configured, for example, as a ball, a hemisphere, a disc, or a wheel, onto a workpiece and to move over its surface with corresponding rotation of the workpiece. A procedure of this type is usually referred to as roller burnishing, burnishing, or deep rolling, and results in chipless smoothing of the surface roughness of the workpiece and the generating of compressive residual stresses in the workpiece. The compressive residual stresses can be influenced in their strength by the pressing force of the tool tip against the workpiece, and in their depth profile by the size of the contact surface, e.g., the radius of the tool-tip ball or hemisphere. The hardness and the wear resistance of the surface, its dynamic stability (fatigue limit, vibration resistance) and its percentage of load bearing area can be increased; crack formation is made more difficult by compressive residual stresses. Smooth cold-worked surfaces also have an increased corrosion resistance.

With known tools the hard tool tips are pressed onto the workpiece by disc spring packages or by a water- or oil-hydraulic system. In spring-loaded versions the tool tip is configured as a ball made from ceramic, rolling over the surface, or as a hemisphere made from diamond, sliding over the surface; in hydraulic solutions preferably as a hydrostatically supported and rolling ceramic ball.

In the case of disc spring packages a particularly compact design and a rapid force buildup is achieved in the workpiece-tool contact. However, even with small deviations from the target pressing-force setting, which can arise from positioning errors, such as from the workpiece contour, a significant deviation in the machining force is to be observed. The hysteresis of the disc spring packages during loading and releasing likewise leads to fluctuating machining forces. The very hard spring-loading tends, with corresponding workpiece roughness, to a hard vibrating of the tool tip, which influences the surface quality, but in particular decreases the service life of the tool tip.

In hydraulic systems, a stroke range with constant pressing force is realized by using a cylinder integrated in the tool. This system indeed has an adjustable and constant pressing force, but has other disadvantages. For example, a hydraulic unit is needed and the way the hydraulic unit is connected to the tool usually precludes the use of an automatic tool changer in the machine tool. Furthermore, many machine tools work with a water-based emulsion as cooling lubricant, and thus using oil in the tool may be undesirable due to the risk of it mixing into the emulsion. In such cases the hydraulic system must be driven with emulsion, which is generally undesirable. For example, emulsions have unfavorable lubrication and pressure resistance, and may come to contain hard or abrasive particles that, despite filtration, lead to a service-life reduction of the hydraulic unit as well as the tool. Sliding the tool tip over the particles or rolling over the particles with the tool tip can damage the tool tip and/or the workpiece.

SUMMARY

The object of the invention is to a achieve, in the context of series production, a chipless smoothing of a surface region of a rolling-element bearing ring with as little as possible tool wear and/or to generate compressive residual stresses, defined in size and depth profile, inside a surface region of a rolling-element bearing ring.

This object is achieved by a method for chipless machining of a surface region of a rolling-element bearing ring. In the inventive method the rolling-element bearing ring is set in rotation relative to two tools, which each include a tool tip. Starting from different start positions the tool tips of the two tools are guided over the surface region in contrary movement with respect to the surface region of the rotating rolling-element bearing ring and pressed here with a pressing force against the surface region so that a helical or spiral-shaped trajectory is formed on the surface region by each tool tip such that the trajectories regionally overlap and cross one another multiple times in the overlap region.

The invention has the advantage that it makes possible, at reasonable expense, a series-production-suitable smoothing of a surface region of a rolling-element bearing ring and/or a defined generating of compressive residual stresses inside a surface region of a rolling-element bearing ring. Here it is particularly advantageous that the tool wear can be kept very low. A rolling-element bearing ring machined using the inventive method has a long service life. Due to the multiple crossings of contrary thread-type tool paths on the workpiece surface the trajectories have a different spacing from one another at each point and thus continuously varying stress states. A preferred cracking direction in the sense of a section of constantly lowered compressive residual stress is avoided.

Tool tips can be used that are manufactured from diamond.

Starting from start positions that are offset from one another by 180° relative to the rotation of the rolling-element bearing ring, the tool tips of the two tools can be guided over the surface region. This has the advantage that forces exerted on the rolling-element bearing ring by the machining nearly compensate and thus need not be supported by the workpiece holder.

Starting from a start position that is disposed, relative to the rotation of the rolling-element bearing ring, in a radial and/or axial end region of the surface region, the tool tip of at least one of the two tools can be guided over the surface region.

Starting from mutually opposing, relative to the rotation of the rolling-element bearing ring, radial and/or axial end regions, the tool tips of the two tools can be guided over the surface region. The tool tips of the two tools can be guided over the surface region with mutually opposing, relative to the rotation of the rolling-element bearing ring, axial or and/or radial movement components. This procedure has the advantage that any distortions of the rolling-element bearing ring caused by the inventive machining can be kept slight and formed symmetric.

In regions the trajectories can be formed not-overlapping. A progressive harmonization to the not-processed surroundings is thereby possible.

The overlap region can extend at least over a main load zone of the surface region, wherein a load ratio, which is defined as the ratio of the load occurring at any position with a maximum allowable load of the bearing ring to a maximum load occurring in the entire surface region, has at least a predetermined minimum value throughout. For example, the minimum value for the load ratio can be 0.8. It is also possible to specify a minimum value of 0.5 for the load ratio. It can be ensured by this procedure that the rolling-element bearing is particularly well-machined in particularly critical regions.

However, the start positions of the tool tips of the two tools can each fall outside the main load zone. In this manner damage, possibly of serious consequence, to the surface region can be avoided in the main load zone.

In the context of the inventive method it can thus proceed that the tool tip of at least one of the two tools contactingly abuts, inside a contact zone, on the surface region of the rolling-element bearing ring; the pressing force acts along a force direction; and in an advancing plane, which is spanned by a surface normal oriented perpendicular in the contact zone to the surface region and an advancing direction in which the tool is moved, the force direction is inclined towards the advancing direction and encloses an angle of at least 2° with the surface normals. This has the advantage of further wear reduction. The force direction can enclose an angle of at most 15° with the surface normal. In particular, the force direction can enclose an angle of at least 5° and/or at most 10° with the surface normal. In a plane spanned perpendicular to the advancing plane the force direction can enclose an angle of at most 1° with the surface normal. Relative to the circumferential direction of the rolling-element bearing ring, the force direction can extend parallel to the surface normal. Here a parallelism is assumed if the angle enclosed is smaller than 1°. Accordingly the force direction can be inclined exclusively within the advancing plane.

The tool tip of at least one of the two tools can be moved at a speed of 0.05 mm/revolution to 0.15 mm/revolution. A higher speed results in a groove structure with poorer roughness and a very inhomogeneous distribution of the compressive residual stresses. A lower speed leads to a very high material loading and to an uneconomical duration of machining.

The surface region can have a path speed of 50 m/min to 150 m/min. A higher speed reduces the service life of the tool tip. A lower speed makes more difficult the low-vibration and -friction sliding of the tool tip on the fluid film.

The tool tip of at least one of the two tools can be pressed against the surface region with a pressing force of 200 N to 750 N. This range applies in particular for a tool tip that has a radius of curvature of 3 mm. With a smaller radius of curvature the required pressing force tends to decrease; with a larger radius of curvature the required pressing force tends to increase. With rolling-element bearing rings having small diameters a lesser pressing force can be used than with rolling-element bearing rings having large diameters. A lesser pressing force is used for smoothing than for generating of compressive residual stresses. Depending on the path length which was already covered by the same tool tip, the pressing force can be increased. A reduced effect of the tool tip as a result of a wear-related flattening can thereby be compensated.

A film made from a cooling- and/or lubricating-medium can be formed in the advancing direction of the tool and in the rotation direction of the rolling-element bearing ring in front of the tool tip on the surface region of the rolling-element bearing ring. In particular, by supplying a cooling- and/or lubricating medium a floating of the tool tip and thus an at least partial separating between the tool tip and the surface region can be achieved. This contributes to a reducing of the wear of the tool tip.

After the chipless machining the surface region can be honed or subjected to a vibratory finishing treatment. Surface damage can thereby be removed or at least reduced without an appreciable effect on the compressive residual stress distribution produced by the inventive method.

The invention further relates to a rolling-element bearing ring including a surface region, which includes two compressive residual stress patterns configured helical or spiral-shaped, which regionally overlap and cross multiple times in the overlap region.

The inventive rolling-element bearing ring is characterized by a long service life and is very resistant to crack formation. The chosen geometry of the compressive residual stress patterns results in continuously varying stress states. A preferred cracking direction in the sense of a section of constantly lowered compressive residual stress is avoided.

The compressive residual stress patterns can be formed by depressions formed in a chipless manner. The compressive residual stress patterns can have a mutually opposing direction of rotation.

In addition, the invention relates to a rolling-element bearing including an inventively configured rolling-element bearing ring.

The elastic element can have an elastic constant of at most 200 N/mm, preferably at most 150 N/mm, particularly preferably at most 100 N/mm. Such a flat elastic characteristic curve has the advantage that the pressing force of the tool tip against the surface region of the rolling-element bearing ring varies only slightly when the position of the surface region in the force direction changes. With certain deviations from the target spring-deflection the flat elastic characteristic curve also leads to an only very slightly deviating machining force and as soft spring-loading simultaneously prevents the overloading of the tool tip with workpiece roughnesses, whereby the tool life increases substantially. A position change and an associated deviation from the target spring deflection can occur in particular with large workpieces with their naturally large dimensional-, angular-, and positional-tolerance, or in cases wherein the profile of the machined surface region is only approximately tracked with the tool wherein, for example, curved sections are approximated by straight lines. In such cases a particularly small elastic constant is required. If, however, only very slight tolerances occur, good results can be achieved even with a larger elastic constant.

The elastic element can have a preload of at least 200 N. Here as a rule for smoothing the surface region lower preloads are sufficient for generating sufficiently high compressive residual stresses. The preload can be at most 750 N. This value applies in particular for a tool tip having a radius of curvature of 3 mm.

The elastic element can be configured, for example, as a coil spring. With a coil spring a flat elastic characteristic curve can be realized very easily. In addition, coil springs are economically available in nearly all conceivable dimensions and having nearly all conceivable elastic characteristic curves. A further advantage of coil springs is that that they are very robust. A coil spring having a rectangular wire cross-section is particularly suitable.

At least one end of the elastic element can be rotatably supported. Preferably both ends of the coil spring are rotatably supported. In particular, at least one end of the coil spring can be rotatably supported by a sliding bearing. Interfering torsional moments can be prevented from forming by a rotatable supporting.

It is made clear by the term "tool tip" that it is an end piece of the tool. A limitation to a pointed design, for example, having an extremely small radius of curvature, should not be associated therewith. In particular, the tool tip can also be rounded. A representative diameter of the tool tip can be between 3 mm and 9 mm. The representative diameter of the tool tip is preferably between 5 mm and 7 mm. With smaller diameters efficient machining cannot be achieved and only very close-to-the-surface compressive residual stresses can be generated. With large diameters it is very difficult to make possible a machining of edge regions, and too-high pressing forces are needed. The representative diameter of the tool tip can be defined as the diameter of a best-fit sphere determined using a least-squares fitting. In particular, the tool tip can be configured spherical in sections.

As a rule the speed of the tool and the speed of the tool tip are identical and in many cases can be used interchangeably.

BRIEF DESCRIPTION OF THE DRAWINGS

The invention is explained in more detail in the following with reference to the Figures.

DETAILED DESCRIPTION

Figure 1:
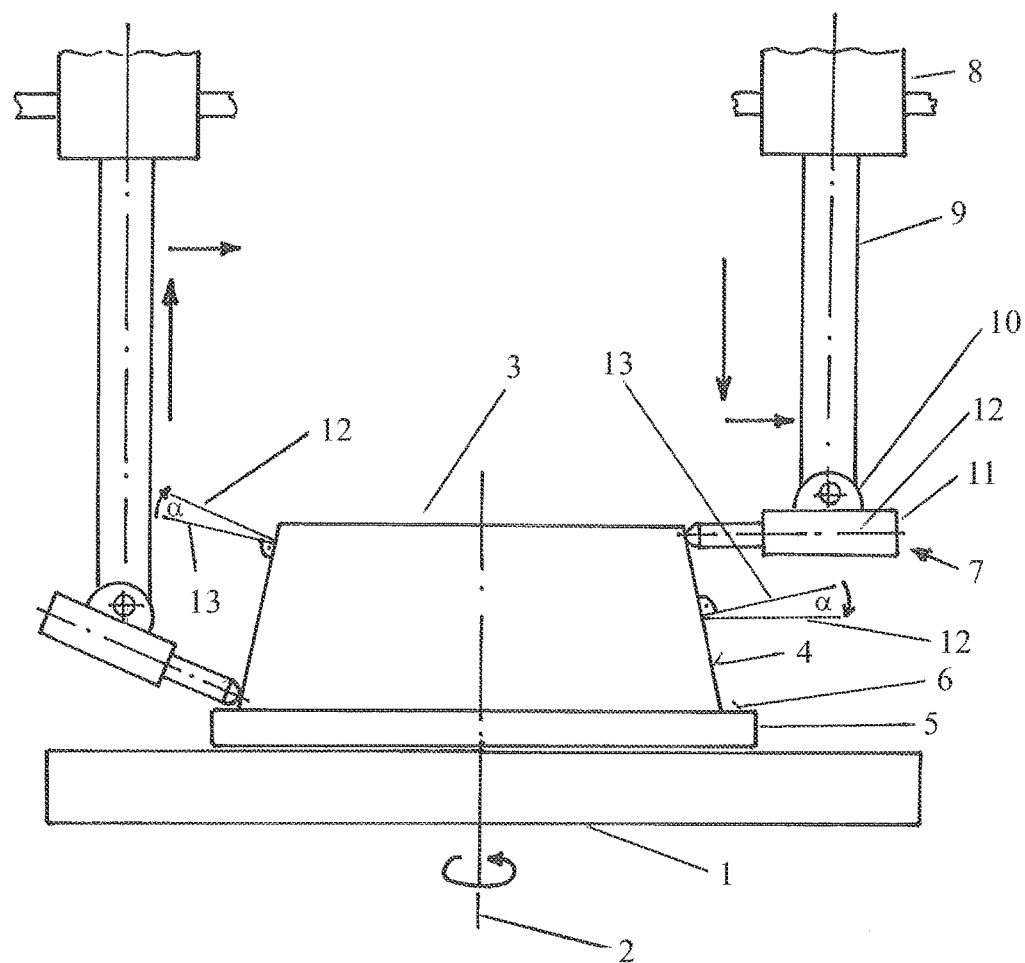
FIG. 1 shows a partial view of an exemplary embodiment of a machine tool during the operation in a schematic side view.

FIG. 1 shows a partial view of an exemplary embodiment of a machine tool during operation in a schematic side view.

The machine tool includes a workpiece holder 1, which is rotatably supported about an axis of rotation 2. A rolling-element bearing ring 3 is disposed on the workpiece holder 1 and connected to the workpiece holder 1 for rotation therewith. The rolling-element bearing ring 3 is disposed on the workpiece holder 1 rotationally symmetric to the axis of rotation 2. In the following the direction parallel to the axis of rotation 2 of the workpiece holder 1 is referred to as the axial direction, the direction perpendicular to the axis of rotation 2 of the workpiece holder 1 as the radial direction. The connection for conjoint rotation between the rolling-element bearing ring 3 and the workpiece holder 1 can be effected, for example, by a magnetic fixing or using not-figuratively-depicted clamping jaws, which clamp the rolling-element bearing ring 3. Likewise a combination of magnetic fixing and mechanical clamping is also possible. In the depicted exemplary embodiment the rolling-element bearing ring 3 is configured as an inner ring of a tapered roller bearing and includes a conical raceway 4, and in the region of an axial end a contact flange 5 including a contact surface 6. The raceway 4 and the contact surface 6 can be machined by the machine tool and are also subsumed in the following under the generic term "surface region." The raceway 4 and/or the contact surface 6 and/or another to-be-machined partial surface of the surface of the rolling-element bearing ring 3 is thus to be understood by "surface region."

Figure 2:
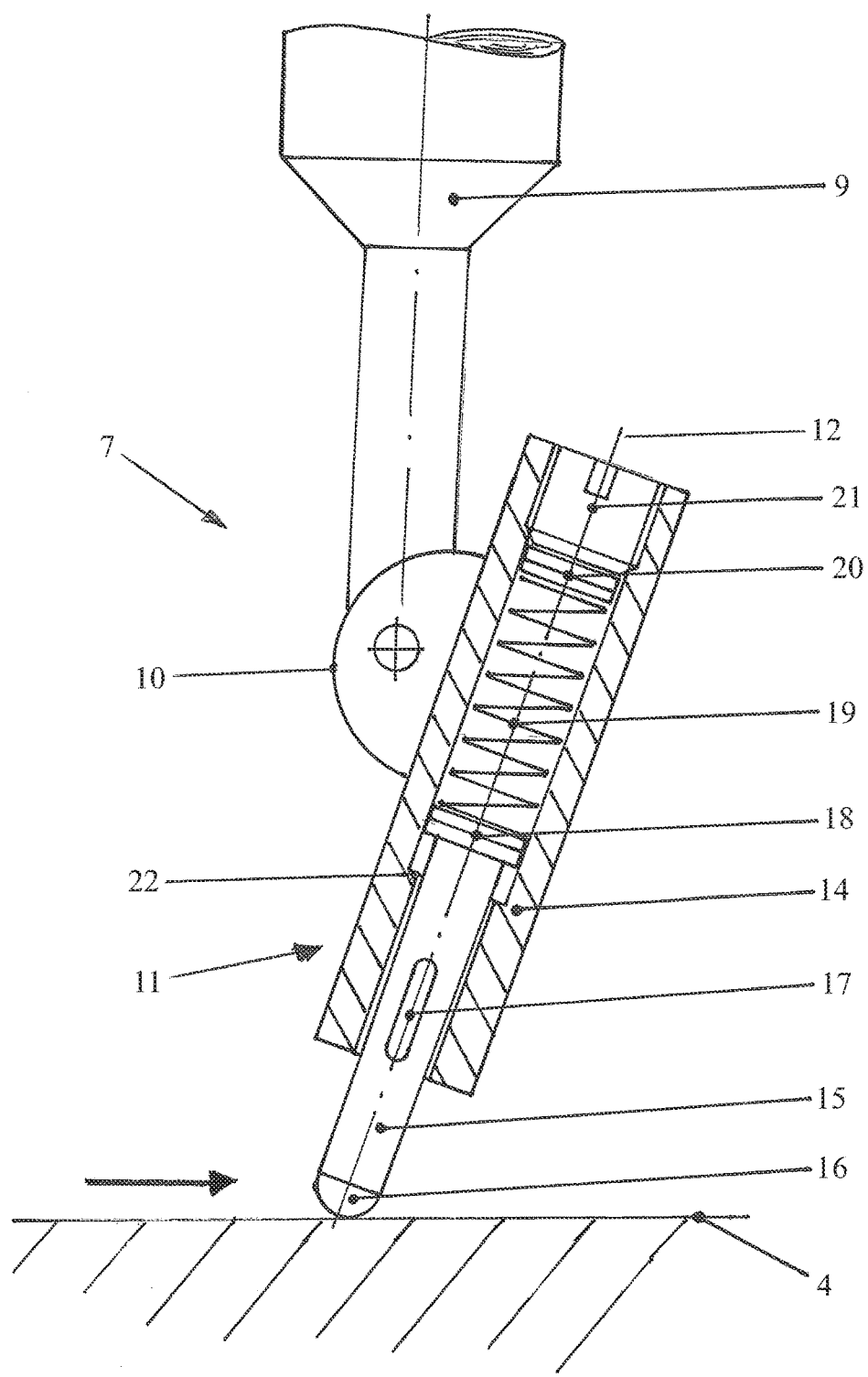
FIG. 2 shows an exemplary embodiment of the inventive tool in a schematic sectional view.

Two tools 7 are disposed radially adjacent to the rolling-element bearing ring 3 on diametrically opposing sides with respect to the axis of rotation 2 of the workpiece holder 1. In other words, the tools 7 are disposed offset by 180° in the circumferential direction of the rolling-element bearing ring 3. An exemplary embodiment of the tools 7 is depicted in FIG. 2. The tools 7 are each fixed in a tool holder 8, which can move the tools 7 in the axial and radial direction as well as in combinations of these directions. The movement in the axial and radial direction is indicated in FIG. 1 by arrows. The tool holders 8 are constructed such that a fast tool change is possible. In particular, the tool holders 8 and the not-figuratively-illustrated other components of the machine tool can be configured in a manner analogous to a hard turning machine. For example, the tool holders 8 can be configured as so-called. Capto tool holders. However, the tools 7 are built completely differently than is the case with the tools of a hard turning machine.

Deviating from the depiction of FIG. 1, it is also possible in principle that the machine tool includes only a single tool 7 or that the machine tool includes an inventive tool 7 and a machining tool, for example, a hard turning tool, configured in another manner.

The tools 7 each have a connection piece 9, a pivot device 10, and a head part 11. The connection piece 9 is clamped in the tool holder 8 of the machine tool. The head part 11 has a longitudinal axis 12 and, using the pivot device 10, is pivotable relative to the connection piece 9. An angle α, which the longitudinal axis 12 of the head part 11 encloses with a surface normal 13, which is oriented perpendicular to the machined surface region, for example the raceway 4 or the contact surface 6, changes due to the pivoting movement. To illustrate this geometry the longitudinal axes 12 of the head parts 11 of the two tools 7 and the surface normals 13 are each depicted again separately in FIG. 1 for another machining position.

FIG. 2 shows an exemplary embodiment of the tool 7 in a schematic sectional depiction. In the following the structure of the head part 11 in particular is explained in more detail.

The head part 11 includes a housing 14, which can have, for example, the shape of a hollow cylinder and partially receives a tip carrier 15. The tip carrier 15 is configured, for example, as a plunger and disposed coaxial to the longitudinal axis 12 of the head part 11. A tool tip 16 is attached to the tip carrier 15, in particular soldered-on, in the region of that axial end of the tip carrier 15 that protrudes out of the housing 14. The tool tip 16 can be manufactured in particular from diamond. The tool tip 16 has, for example, the shape of a hemisphere and is attached to the tip carrier 15 such that a predetermined orientation between the head part 11 and the diamond crystal lattice is respected. The hemisphere has a diameter between 3 mm and 9 mm, preferably between 5 mm and 7 mm. Instead of a spherical shape, the tool tip 16 can also have any other rounded shape. This can be described by a representative diameter, which is defined as the diameter of the best-fitting sphere. The best-fitting sphere can be determined by a least-squares fitting inside the rounded region of the tool tip 16.

The tip carrier 15 is guided in the housing 14 such that it is movable parallel to the longitudinal axis 12 of the head element 11. In order to prevent a rotating of the tip carrier 15, it includes an anti-rotation device 17. The anti-rotation device 17 can be configured, for example, as a projection, which engages in a not-figuratively-depicted depression in the housing 14. A first axial sliding bearing 18, an elastic element 19, a second axial sliding bearing 20, and a pressure-adjustment screw 21 are sequentially disposed in the housing 14 axially adjacent to the tip carrier 15.

The elastic element is preloaded parallel to the longitudinal axis 12 of the head part 11 and rotatably supported between the first axial sliding bearing 18 and the second axial sliding bearing 20 so that a torsion of the elastic element 19 does not occur. The elastic element 19 acts on the tip carrier 15 via the first axial sliding bearing 18, so that a force generated by elastic element 19 acts on the tip carrier 15 and thus also on the tool tip 16 along a force direction that coincides with the longitudinal axis 12 of the head part 11.

The first axial sliding bearing 18 can be formed, for example, by a disc or by two axially adjacent discs, wherein one of the discs is fixedly connected to the tip carrier 15 and in particular can be configured as an integral component of the tip carrier 15 and has a larger diameter than the tip carrier 15. In cooperation with a shoulder 22 formed on the inside of the housing 14, a falling-out from the housing 14 of the tip carrier 15 can thereby be prevented. If the disc mentioned is not fixedly connected to the tip carrier 15, at least the spring path of the exemplary embodiment 19 is limited by the shoulder 22. In this case the tip carrier 15 can be pulled out of the housing 14 without relaxing the elastic element 19. The second axial sliding bearing 20 can also be formed by a disc or two discs.

The elastic element 19 disposed between the axial sliding bearings 18, 20 can be configured in particular as a coil spring having a preferably rectangular cross-section, i.e., for example, manufactured from a wire having a rectangular material cross-section. A torsion of the coil spring and a variation associated therewith of the force by which the coil spring is pressed against the tip carrier 15 is prevented by the axial sliding bearings 18, 20. A torsion can be caused, for example, by a turning of the pressure-adjustment screw 21 or by a spring deflection of the elastic element 19.

Using the pressure-adjustment screw 21 the preload of the elastic element 19 can be varied. A screwing-in of the pressure-adjustment screw 21 into the housing 14 results in a higher preload, a screwing-out in a lower preload. The elastic element 19 has a very flat elastic characteristic curve, which is caused by a correspondingly small elastic constant, so that the restoring force changes only slowly with the compressing of the elastic element 19, and with only a slight movement of the tip carrier 15 is nearly constant. This has the consequence that the preload of the elastic element 19 can be very sensitively calibrated by turning the pressure-adjustment screw 21 even if the pressure-adjustment screw 21 does not have a fine thread, and the operation is thus very simple. In addition, a flat elastic characteristic curve causes that after the delivery of the tool 7 to the rolling-element bearing ring 3 and placing of the tool tip 16 on the raceway 4, the tool tip 16 is pressed against the raceway 4 with nearly constant force even if, for example, the immersion depth of the tip carrier 15 into the housing 14 varies slightly during machining due to the tolerances of the rolling-element bearing ring 3 and/or the machine tool. A pressing path of 1 mm to 2 mm can be provided, for example from the first contact of the tool tip 16 to the raceway 4 of the rolling-element bearing ring 3 up to the working position and a tolerance around the then-reached working point of +/−0.25 mm, wherein in this range a force of, for example, 600 N varies by only +/−15 N. For example, an elastic element 19 can be used whose elastic constant is 60 N/mm. Generally an elastic constant up to at most approximately 200 N/mm is possible. The elastic constant should preferably be at most 150 N/mm, or better, at most 100 N/mm. In order to nonetheless achieve a sufficiently high preload of, for example, at least 200 N, a very strong compression of the elastic element 19 is required.

A high preload of the elastic element 19 has the consequence that when placing the tool tip 16, for example, onto the raceway 4 of the rolling-element bearing ring 3, the tool tip 16 is abruptly pressed against the raceway 4 with a force that corresponds to the preload. In order to attenuate this hard placing and to reduce the damage potential of the first contact, a not-figuratively-depicted further elastic element can be provided in series with the elastic element 19, which further elastic element has a substantially steeper elastic characteristic curve and is not or only minimally preloaded. It can prevented here, for example, by a not-figuratively-depicted further shoulder that the preload of the elastic element 19 acts on the further elastic element. This then has the consequence that the pressing force of the tool tip 16 with first contact with the raceway 4 is initially nearly equal to zero and with increasing proximity of the tool 7 to the rolling-element bearing ring 3 quickly increases to the pressing force intended for the machining. A rebounding of the further elastic element and a strong fluctuation associated therewith of the pressing force can be prevented by the tip carrier 15 being pressed somewhat farther into the housing 14 by a further delivering of the tool 7 to the rolling-element bearing ring 3 after the complete compressing of the further elastic element and the elastic element 19 thereby being compressed.

The further elastic element can be, for example, a relatively soft disc spring, which is disposed between the tip carrier 15 and the first axial sliding bearing 18 and in the loaded state is pressed into an elastically rigid position by the preload force of the elastic element 19. In the unloaded state the soft disc spring presses the tip carrier 15 out of the housing 14 until the soft disc spring is relaxed.

As shown in FIGS. 1 and 2 the longitudinal axis 12 of the head part 11, and thus the direction of the force by which the tool tip 16 is pressed against the raceway 4 during machining, is oriented not perpendicular to the raceway 4 or not parallel to the surface normal 13. Instead the longitudinal axis 12 of the head part 11, and thus the force direction in an advancing plane, which is spanned by the surface normal 13 and an advancing direction of the tool 7, encloses an angle α greater than 0° with the surface normal 13. The angle α can be 2 to 15°, in particular 5 to 10°. Here the inclination direction of the head part 11 of the tool 7 is chosen such that the head part 11 is inclined in the advancing direction, i.e., the longitudinal axis 12 of the head part 11 encloses an angle of less than 90° with the advancing direction.

In FIG. 1 the advancing direction of the tool 7 depicted at left in the drawing plane extends obliquely upward, and that of the tool 7 depicted at right in the drawing plane extends obliquely downward. Relative to the circumferential direction of the rolling-element bearing ring 3 the longitudinal axis 12 of the head part 11 is oriented perpendicular to the raceway 4, i.e., the longitudinal axis 12 of the head part 11 falls within the advancing plane. In the following the angle α is therefore also referred to as the following angle, since the tool tip 16 including the tip carrier 15 is pulled along in the advancing direction.

To illustrate the geometry, in FIG. 1 the longitudinal axis 12 of the head part 11 and the surface normal 13 of the raceway 4 are each drawn at a distance from the current machining position. In FIG. 1 the advancing movement respectively extends parallel to the raceway 4 between the two axial ends of the rolling-element bearing ring 3 and is generated by a superposition of a movement in the axial direction of the workpiece holder 1 and a movement in the radial direction of the workpiece holder 1. In FIG. 2 the advancing direction of the tool 7 is indicated by an arrow.

Due to the above-described geometry it is achieved that the tool tip 16 slides over surface irregularities and presses these flat, without meshing with them in a wear-promoting manner and without tending to fly upward. Machining marks generated by the premachining of the raceway 4 are substantially radially-encircling, so that during movement in the advancing direction they appear as surface irregularities. A further consequence of the above-described geometry is that the tool tip 16 is worn primarily within a wear region, which is not disposed coaxial to the longitudinal axis 12 of the head part 11. In principle the possibility thus exists to reposition the tool tip 16 and continue the machining with the same tool tip 16 outside the wear region. In addition, this geometry makes possible a machining of the raceway 4 by the tool 7 up to close to the guide flange 5. However, the following angle α cannot be selected arbitrarily large, since with increasing following angle α the frictional forces between the tip carrier 15 and the housing 14 are increased, the soldering or other attaching of the tool tip 16 on the tip carrier 15 is increasingly stressed by shearing and an increasingly higher preload of the elastic element 19 is needed to generate the same normal component of the pressing force by which the tool tip 16 is pressed against the raceway 4. The effects described up to now of the following angle α would also be achievable with an inclination of the machining head mirrored with respect to the surface normal, i.e. with a leading tool tip 16. However, in a dynamic analysis, i.e., in the case of an advancing movement, this would lead to strong vibrational excitation of the tip carrier 15 due to surface irregularities. This would in turn result in non-uniformities of the machining and load peaks, and would ultimately lead to a significant reduction of the service life of the tool tip 16.

In principle it would also be possible to incline the longitudinal axis 12 of the head part 11 in the circumferential direction of the rolling-element bearing ring 3, since in this direction a movement also takes place during the machining due to the rotation of the rolling-element bearing 3. However, due to the very high speed of movement of the rolling-element bearing ring 3 in the circumferential direction, which is higher by a multiple than the advancing speed of the tool 7, in any case no appreciable vibration excitation results from the circumferential movement. What is more the raceway 4 of the rolling-element bearing ring 3 primarily has machining marks, for example, due to grinding or turning, that primarily extend in the circumferential direction. A movement in the circumferential direction thus occurs substantially parallel to the machining marks. In contrast, a movement in the advancing direction occur transverse to the circumferential direction and thus also transverse to the machining marks and is thus associated with a strong vibration excitation. For this reason the inclination is required of the longitudinal axis 12 of the head part 11 in the advancing direction. An inclination of the longitudinal axis 12 of the head part 11 in the circumferential direction is not required, but also has no negative effect. For this purpose in particular the same angle ranges come into consideration as described for the advancing direction.

A further measure for reducing wear consists in equipping the machine tool with a not-figuratively-depicted device that pumps a cooling- and/or lubricating-medium in the region of the contact between the tool tip 16 and the raceway 4. The pumping pressure can be approximately 20 bar and more. An at least partial separating between tool tip 16 and raceway 4 in the form of floating can thereby be generated. For this purpose the tool tip 16 must be flowed-against from the main direction, which results from the rotation of the workpiece holder 1, and from the secondary travel direction, which results from the advancing of the tool, with a closed and bubble-free as well as thick-as-possible and pressure-resistant media film on the raceway 4 or the contact surface 6 of the rolling-element bearing ring 3. The flow direction of the media film must be such that the disturbance and turbulence generated by the tool tip 16, which disturbance and turbulence simultaneously represents an underpressure region, occurs against the direction of travel. Additives can be added to the oil portion of the medium used, usually a water-based cooling- and/or lubricating-medium, which additives increase the pressure stability of the medium. The water portion must nonetheless predominate in order to guarantee an optimal heat dissipation from the tool tip 16.

For an optimal flowing-against of the tool tip 16 it can be useful to choose an implementation for the cooling- and/or lubricating-medium integrated into the tool 7, which is fed machine-side via the tool holder 8 and conducts the medium via the tool 7 into the desired position relative to the tool tip 16. A plurality of media-stream outlets can be necessary to achieve a sufficient media film on the workpiece.

Using the above-described tool 7 in combination with a suitable cooling- and/or lubricating-device, for the case of a merely ground and not honed surface a slide path of the tool tip 16 on the rolling-element bearing ring 3 of approximately 100 km until the developing of a flattening can be achieved, which impacts the formation of the compressive residual stresses in a no-longer-justifiable manner. Thereafter another region of the tool tip 16 must be selected for the contact to the raceway 4 or the contact surface 6, or the tool tip 16 must be replaced. A change of the tool tip 16 is possible with comparatively little effort if during the change the preload of the elastic element 19 is preserved. During the change of the tool tip 16 the head part 11 of the tool 7 is not dismantled and the elastic element 19 is not relaxed. Thus a recalibrating of the preload of the elastic element 19 after the change of the tool tip 16 is unnecessary. This is possible, for example, if the tip carrier 15 is not fixedly connected to the first axial sliding bearing 18 and can be pulled out from the housing 14. In this case a captive securing is recommended, which prevents an unintentional falling-out of the tip carrier 15 from the housing 14.

The machine tool is designed such that it sets the rolling-element bearing ring 3 in rotation such that its raceway 4 or its contact surface 6 has a speed relative to the tool tip 16 of, for example, between 50 m/min and 150 m/min, preferably 120 m/min. The advancing of the tool 7 occurs transverse to the circumferential direction of the rolling-element bearing ring 3 and can be, for example, from 0.05 mm/revolution to 0.15 mm/revolution. In each case here reference is made to the rotation of the rolling-element bearing ring 3. For the pressing force by which the tool tip 16 is pressed against the raceway 4 or against the contact surface 6 of the rolling-element bearing ring 3, values, for example, between 250 and 750 N can be used if a diamond hemisphere having a diameter of 6 mm is used as tool tip 16. By machining using the tool tip 16 the roughness of the already previously finely machined raceway 4 or contact surface 6 of the rolling-element bearing ring 3 surface can be reduced from, for example, Ra 0.45 to Ra 0.15 or from Ra 0.30 to Ra 0.05.

Using the machine tool, compressive residual stresses of up to 1000 MPa can be generated in the rolling-element bearing ring 3 up to 500 microns in depth with a maximum depth of 100 to 200 microns. Here the depth is calculated from the surface of the rolling-element bearing ring 3. The larger the diameter of the tool tip 16, the greater the achievable depth. The higher the pressing force used, the larger the compressive residual stresses that can be generated. Values higher than 1000 MPa are indeed achievable, but not beneficial to the product service life.

In order to make possible a precise placing of the tool tip 16 on the raceway 4 or the contact surface 6 of the rolling-element bearing ring 3, a laser-sight device for marking a point of the raceway 4 or of the contact surface 6 of the rolling-element bearing on which the tool tip 16 comes to abutment can be provided on an embodiment of the rolling-element bearing ring 3 for each initial setting-up of the machine tool. Based on the position thus determined, an adjusting of the tool 7 can be carried out, which can be maintained for the machining of further rolling-element bearing rings 3 of the same embodiment. The laser-sight device can in particular be attached to the head part 11 of the tool 7.

The raceway 4 or the contact surface 6 of the rolling-element bearing 3 can be machined using the tool 7. As depicted in FIG. 1, two tools are positioned for this purpose such that their tool tips 16 come to abutment on mutually opposing axial end regions of the raceway 4 on mutually diametrically opposing sides of the rolling-element bearing ring 3. The tools 7 are each brought somewhat closer beyond the first contact of the tool tips 16 to the raceway 4 of the rolling-element bearing ring 3, so that each tip carrier 15 deflects approximately 1 mm to 2 mm into the housing 14 and the elastic element 19 is correspondingly compressed here. Due to the restoring force generated by the elastic element 19, each tool tip 16 is pressed against the raceway 4 of the rolling-element bearing ring 3. As a result of the high preload the pressing force by which the tool tip 16 is pressed against the raceway 4 is higher by a multiple than the restoring force, generated by the delivery movement, of the relaxed elastic element 19 would correspond to.

To machine the raceway 4 of the rolling-element bearing ring 3, the rolling-element bearing ring 3 is positioned with the contact flange 5 forward coaxial to the axis of rotation 2 of the workpiece holder 1 so that the contact flange 5 of the rolling-element bearing ring 3 is disposed adjacent to the workpiece holder 1. In this position the rolling-element bearing ring 3 is fixed on the workpiece holder 1. The fixing can be effected, for example, by using not-figuratively depicted clamping jaws and/or magnetically. The clamping jaws can engage in particular on the inner circumference of the rolling-element bearing ring.

After the fixing of the rolling-element bearing ring 3 the workpiece holder 1 and thus also the rolling-element bearing ring 3 is set in rotation. The speed of rotation can be selected, for example, such that an arithmetic average of the path speed of 120 m/min results on the raceway 4 of the rolling-element bearing ring 3. Subsequently the tools 7 are brought closer to the raceway 4 of the rolling-element bearing ring 3 such that their tool tips 16 come into contacting abutment on the raceway 4. After the first contact between the tool tips 16 and the raceway 4 the tools 7 are again brought closer to the raceway 4 so that the tip carriers 15 are immersed, for example, by 1 mm to 2 mm deeper into the housing 14 and thereby compress initially the further elastic elements upstream for pressure buildup starting at zero, and thereafter the elastic elements 19 by the same amount overall. Due to the flat elastic characteristic curve the restoring force and thus the pressing force of the respective tool tip 16 against the raceway 4 respectively increases only slightly due to the further immersing of the tip carrier 15 into the housing 14. In the context of the above-described mechanical contacting of the raceway by the tool tips 16, if possible the building-up of the pressing force is distributed over at least 10 revolutions of the rolling-element bearing ring 3 in order to hold the risk of damage to the tool tips 16 or to the raceway 4 as low as possible. Damage to the raceway 4 can occur mechanically due to a developing small geometric margin, but also due to a too-high gradient of the generated compressive residual stresses.

As can be seen from FIG. 1, the tool tips 16 of the two tools 7 are placed on the raceway 4 on diametrically opposing sides with respect to the axis of rotation 2 of the workpiece holder 1. In other words, the contact zones of the tool tips 16 of the two tools 7 are offset from each other by 180° in the circumferential direction of the rolling-element bearing ring 3. This geometry has the consequence that the forces exerted by the tool tips 16 on the rolling-element bearing ring 3 approximately compensate and thus do not lead to a detaching of the rolling-element bearing ring 3 from the workpiece holder 1.

Furthermore, the tool tips 16 of the two tools 7 are placed onto the raceway 4 in mutually opposing axial end regions. In the exemplary embodiment depicted in FIG. 1 the tool tip 16 of the one tool 7 is placed onto the raceway 4 in the region of the minimum diameter or adjacent to the minimum diameter of the raceway 4. The tool tip 16 of the other tool 7 is placed onto the raceway 4 in the region of the maximum diameter or adjacent to the maximum diameter of the raceway 4.

Due to the preloading of the elastic elements 19, directly after the placing onto the raceway 4 of the rolling-element bearing ring 3 the tool tips 16 of the two tools 7 are each already pressed against the raceway 4 by the full pressing force intended for the machining. Without further measures there would thus be a risk of a hard placing of the tool tips 16 onto the raceway 4, so that there is a risk of local damage to the raceway 4. This risk can be reduced by a further elastic element being connected upstream of the elastic element 19, which further elastic element has a substantially steeper elastic characteristic curve than the elastic element 19 and is not or only minimally preloaded. Alternatively or additionally there is the possibility to place each of the tool tips 16 onto the raceway 4 in a region wherein damage does not affect the functioning of the bearing ring 3 in an impermissible manner. As a rule this condition is met in the axial end regions of the raceway 4, since in a rolling-element bearing including the inventive rolling-element bearing ring 3, for example, due to the edge chamfers of the rolling elements and optionally an additional curvature of the outer surface of the rolling-element bearing since no contact between the rolling elements and rolling elements raceway 4 arises there or, in the case of a contact, only very low loads occur. This will be explained in more detail with reference to FIG. 4.

After the placing of the tool tips 16 onto the raceway 4, the two tools 7 are moved axially towards each other. This achieved by the advancing movements of the two tools being opposite to each other with respect to the raceway 4 during the machining of the rolling-element bearing ring 3. The advancing movements are each, for example, 0.10 mm/revolution. Here the longitudinal axes 12 of the tip carriers 10 are each inclined in the advancing direction by the above-mentioned following angle α. Although the rotation of the rolling-element bearing ring 3 results in a considerably higher relative movement between the tool tips 16 and the raceway 4 than the advancing movement of the tool 7, and an inclination of the longitudinal axis 12 of the head parts 11 of the two tools 7 in the circumferential direction appears necessary at first glance, for the above-mentioned reasons such an inclination is not required.

Due to the advancing directions opposing with respect to the raceway 4 of the rolling-element bearing ring 3 a meeting of the two tools 7 results in the axial center of the raceway 4, wherein the tool tips 16 of the two tools 7 have the same axial position. Since the two tools 16 are disposed on diametrically opposing sides with respect to the axis of rotation 2 of the workpiece holder 1, despite the meeting the tools 7 do not block each other. The advancing directions of the two tools are also preserved after the meeting until the tool tips 16 have nearly reached the respective opposite axial end of the raceway 4 based on their respective start position. Then the tool tips 16 are lifted from the raceway 4. Ideally the lifting begins with a continuous reduction of the pressing force over at least 10 revolutions. In no case are the tool tips 16 in touching contact with the rolling-element bearing ring 3 guided out over the axial ends of the raceway 4, since this can lead to serious damage to the tool tips 16. At the one axial end of the raceway 4 a collision threatens with the contact flange 5, at the other axial end of the raceway 4 a contact threatens with the edge formed there.

Starting from the meeting of the two tools 7, their tool tips 16 each move over a region of the raceway 4 which has already been machined by the respective other tool tip 16. However, this region does not extend all the way to the axial start position of the machining, since as a rule the contact flange 5 in connection with the inclination of the head part 11 of the tool 7 does not allow this, and since a safety distance to the edge adjacent to the raceway 4 is respected.

However, the dual machining always extends over the entire region, which is used in the operating state of the rolling-element bearing for significant load transfer between the rolling elements and the rolling-element bearing ring.

Some aspects of the machining of the raceway 4 of the rolling-element bearing ring 3 are explained in more detail with reference to FIG. 3.

Figure 3:
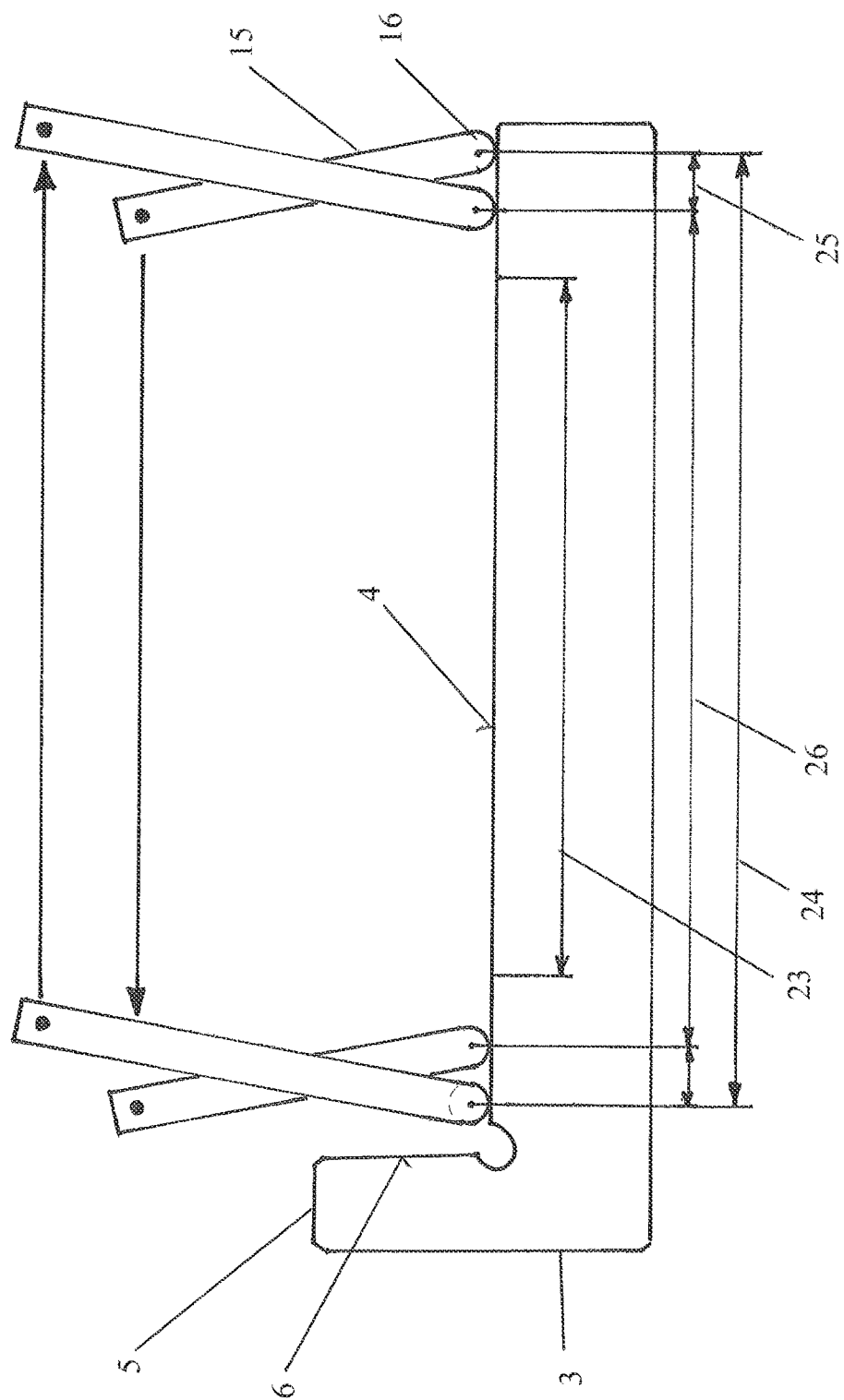
FIG. 3 shows the start and the end of the machining of the rolling-element bearing ring in a highly abstracted depiction.

FIG. 3 shows the beginning and the end of the machining of the rolling-element bearing ring 3 in a highly abstracted depiction. For reasons of clarity the tools 7 are not completely depicted. In addition to a partial view of the rolling-element bearing ring 3, the tip carriers 15 and the tool tips 16 of the two tools 7 are each depicted in their start position at the beginning of the machining as well as in their end position at the end of the machining. In fact, each tool 7 includes only one tip carrier 15 and one tool tip 16, however, two points in time of the machining and thus two different positions of the tip carriers 15 and tool tips 16 are depicted together in the same Figure. The assignment of the start- and end-positions to each tip carrier 15 can be seen from the letters with which the tip carriers are provided. The transitions from the start- to the end-positions are indicated by arrows. In order to facilitate a comparison of the circumstances with the two tools 7, the tool tips 16 of the two tools 7 are depicted in the same circumferential position of the rolling-element bearing ring 3.

During operation in a rolling-element bearing the rolling-element bearing ring 3 is not uniformly loaded by the rolling rolling-elements over the entire axial extension of its raceway 4. Instead, for example, due to the geometry of the rolling elements and/or of the raceway 4, a main loading zone 23 can be formed, within which the raceway 4 is particularly strongly loaded. As a rule the main loading zone 23 respectively extends on both sides from the axial center of the raceway 4 over an axial partial region towards the axial ends of the raceway 4. For example, due to edge chamfers or an outward curvature of the raceway- and/or rolling-element profile, which curvature acts in a load-relieving manner, the axial end regions of the raceway 4 fall outside the main loading zone 23. A quantitative definition of the main loading zone 23 can be specified by a load ratio, which in the operating state of the maximum allowable loading of the rolling-element bearing ring 3 is the ratio of the load occurring at the respective position to the maximum load occurring on the raceway 4. All regions of the raceway 4, within which the load ratio overall falls above a prespecified minimum value, are assigned to the main loading zone 23. The minimum value for the load ratio can be, for example, 0.5 or, more restrictively, 0.8.

Depending on the respectively performed machining the raceway can be divided in a machining region 24, two single-machining regions 25 and a double-machining region 26. The two single-machining regions 25 are disposed in the vicinity of the axial ends of the raceway 4 and enclose the double-machining region 26. The entire axial extension of the two single-machining regions 25 and of the double-machining region 26 yields the machining region 24. One of the two tool tips 16 is placed in each of the two single-machining regions 25 and then moved towards the respective other single-machining region 25. However, the respective tool tip 16 does not advance up to in the respective other single-machining region 25, but is lifted from the raceway 4 beforehand. The double-machining region 26 is machined by both tool tips 16, and as a result a double machining of the raceway 4 takes place inside the double-machining region 26.

Since a careful machining of the raceway 4 is required, in particular inside the main loading zone 23, the machining is designed such that the double-machining region 26 completely encloses the main loading zone 23 of the raceway 4.

After the machining by the two tools 7, if the machining only aims for the generating of compressive residual stresses, the raceway 4 of the rolling-element bearing ring 3 can be honed. The roughness can thereby be changed to a level other than that achieved during the machining, and, in particular, undesired machining marks can be removed. Such machining marks are in particular small scratches or minute eruptions, which can arise due to entry of hard particles between the tool tip 16 and the raceway 4. Since here only a very slight material removal occurs, the distribution of the compressive residual stresses changes only negligibly. Instead of honing, other methods with low material removal can be used, such as, for example, vibratory finishing.

Figure 4:
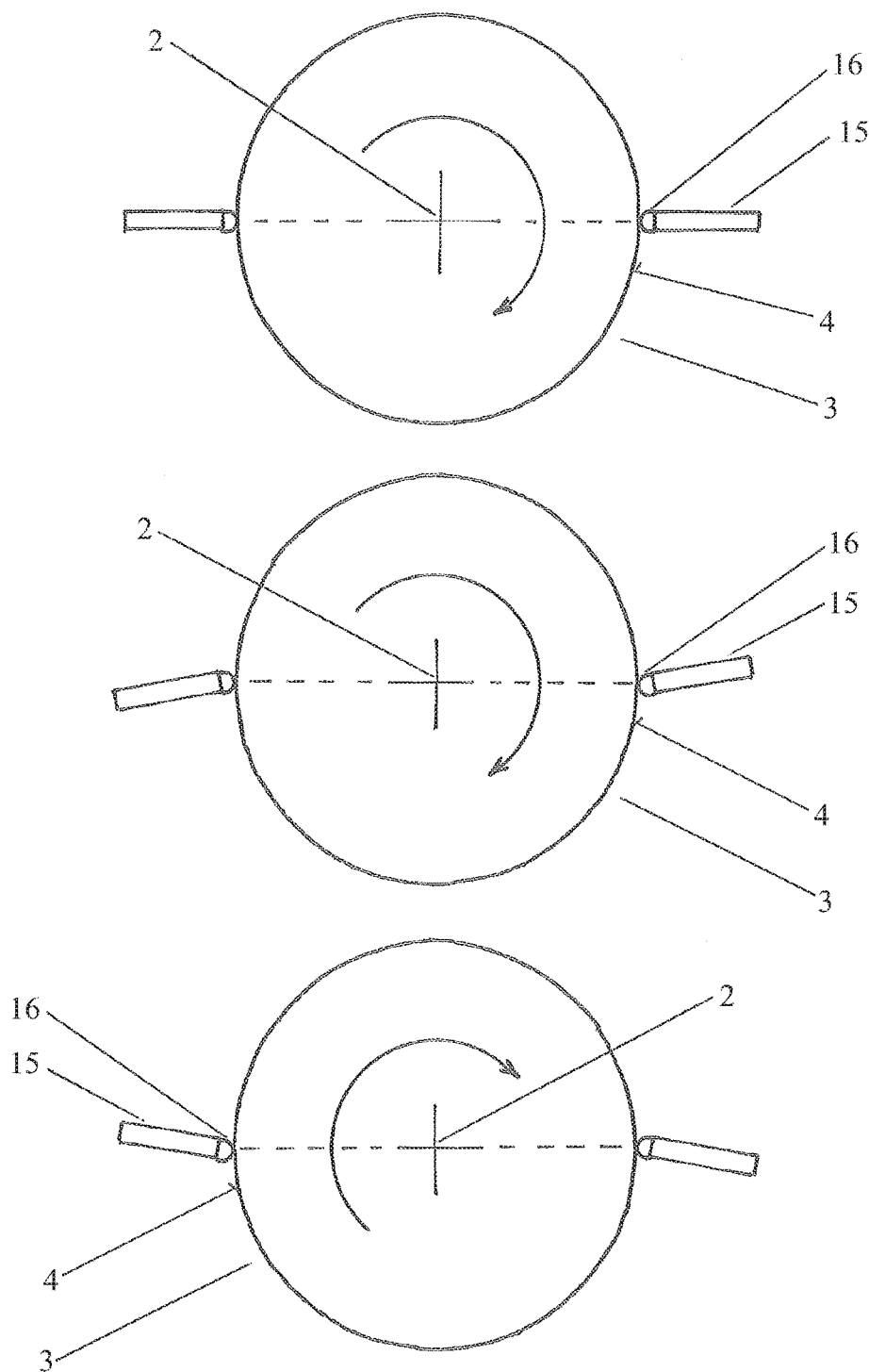
FIG. 4 shows a schematic depiction of three variants of the positioning and angular orientation of the two tools relative to the rolling-element bearing ring.

FIG. 4 shows a schematic depiction of three variants of the positioning and angular orientation of the two tools 7 relative to the rolling-element bearing ring 3. The raceway 4 and the two tip carriers 15 including the tool tips 16 are respectively depicted. The advancing plane respectively extends perpendicular to the drawing plane, so that the inclination of the tip carrier 15 in the advancing plane is not visible in FIG. 5. Nonetheless in all three variants the above-described inclination of the longitudinal axes 12 of the head part, and thus of the tip carrier 15, are present in the advancing plane.

In the variant depicted above in FIG. 4, no further inclination of the tip carrier 15 is provided, so that relative to the circumferential direction of the rolling-element bearing ring 3 it is oriented perpendicular to the raceway 4.

In the variant depicted in the middle in FIG. 4, the tip carriers 15 are inclined against the direction of rotation of the rolling-element bearing ring 3, so that a following movement in the circumferential direction of the tip carriers 15 including the tool tips 16 results.

In the variant depicted below in FIG. 4, the tip carriers 15 are inclined against the direction of rotation of the rolling-element bearing ring 3 in an analogous manner to the variant depicted in the middle, so that a following movement in the circumferential direction of the tip carriers 15 including the tool tips 16 results. The geometry of the variant depicted in the middle and below is very similar. However, in the variant depicted below the inclination of the tip carriers 15 against the direction of rotation of the rolling-element bearing ring 3 does not come about due to a corresponding pivoting of the tip carriers 15, but due to a linear displacement of the tip carriers 15 without an angular movement. The variant depicted below thus comes about in particular if the tip carriers 15 are inclined against the direction of rotation of the rolling-element bearing ring 3; however, for this purpose no pivot mechanism is present. In addition, the lower variant makes possible a very precise setting of the inclination angle of the tip carriers 15 relative to the rolling-element bearing ring 3 by reading a linear scale when moving the tip carriers 15.

Figure 5:
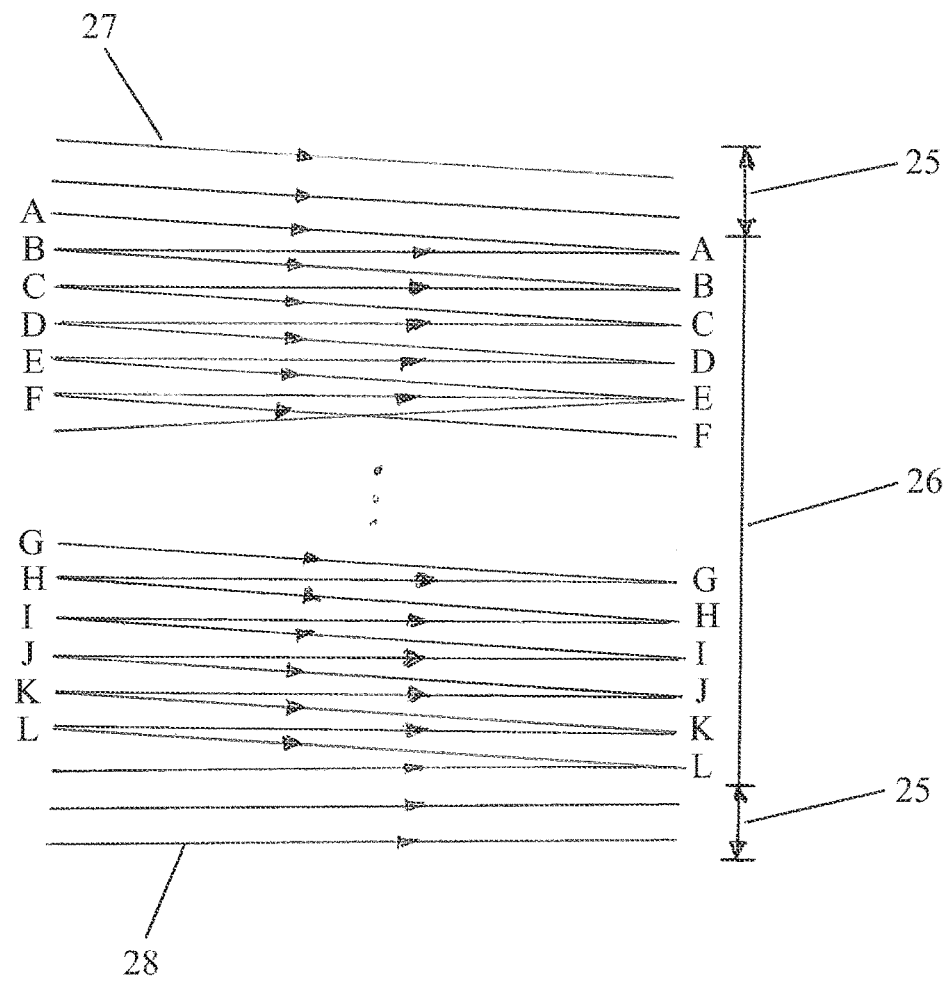
FIG. 5 shows a greatly enlarged and idealized depiction of a pattern of trajectories, which are formed by the tool tips of the two tools in the machining on the raceway of the rolling-element bearing ring.

FIG. 5 shows a greatly enlarged and idealized depiction of a pattern of trajectories 27, 28, which are formed by the tool tips 16 of the two tools 7 during the machining on the raceway 4 of the rolling-element bearing ring 3. Furthermore, for reasons of clarity the machining situation is drawn schematically above left in FIG. 5. The trajectories 27, 28 are depicted on an unwinding of the raceway 4, wherein to simplify the illustration a cylindrical raceway 4 has been chosen. The relationship between the unwound-depicted raceway 4 and the geometry of the raceway 4 on the rolling-element bearing ring 3 is illustrated by a partial unwinding of the raceway 4 displayed above the trajectory pattern. The points of the trajectories 27, 28 on the two ends of the unwound raceway 4 are designated with letters A to L, wherein identical letters are respectively used for pairs of points that are directly adjacent in the not-unwound depiction. The same labeling is also used in the partially unwound raceway 4.

The arrows drawn respectively indicate the movement direction of the respective tool tip 16 relative to the raceway 4. In order to make the characteristics of the trajectories 27, 28 more clearly visible, the trajectories 27, 28 are depicted greatly distorted. In the advancing direction of the tools 7 the trajectories 27, 28 are depicted greatly stretched, and in the circumferential direction of the rolling-element bearing ring 3 greatly compressed. In addition, the depiction is based on exactly identical advancing speeds of the two tools 7 and on an exactly constant speed of rotation of the rolling-element bearing ring 3.

The upper and lower parts of the trajectory pattern of FIG. 5 show the single-machining regions 25. In the upper single-machining region 25 only the first trajectory 27 is present, since in this location the raceway 4 is only machined by one of the two tools 7. In the lower single-machining region 25 only the second trajectory 28 is present, since in this location the raceway 4 is only machined by the other tool 7. In the double-machining region 26, which is disposed between the two single-machining regions 25, the raceway 4 is machined by both tools 7. Consequently in the double-machining region 26 both the first trajectory 27 and the second trajectory 28 are present. Both trajectories 27, 28 consequently each have the superposition of the advancing movements of the tools 7 and the rotational movement of the rolling-element bearing ring 3 in the form of a helix, however with mutually opposing direction of rotation. Since the two tools 7 start the machining from opposing axial ends of the raceway 4 and end in the vicinity of the respective other axial end, with each revolution of the rolling-element bearing ring 3 the first trajectory 27 and the second trajectory 28 cross twice in the double-machining region 26. In the idealized depiction of FIG. 5, the crossing points all fall at two fixed circumferential positions. However, in reality due to the finite precision, the circumferential positions of the crossing points can vary in the machining.

Since the tool tips 16 of the two tools 7 are pressed against the raceway 4 of the rolling-element bearing ring 3 along the trajectories 27, 28, the raceway 4 is smoothed and pressed-in with low pressing forces along the trajectories 27, 28, so that a groove pattern corresponding to the pattern of the trajectories 27, 28, is generated on the raceway 4 of the rolling-element bearing ring 3. In addition, with higher pressing forces local compressive residual stresses are generated in the material of the rolling-element bearing ring 3 by the pressing of the tool tips 6 against the raceway 4, which compressive residual stresses have a defined size and a defined depth profile. With the machining of the rolling-element bearing ring 3 a pattern of compressive residual stresses corresponding to the pattern of the trajectories 27, 28 and to the groove pattern is thus formed.

Due to the compressive residual stresses, a forming and an enlarging of cracks in the region of the raceway 4 of the rolling-element bearing ring 3 can be inhibited, and damage to the rolling-element bearing ring 3 can thereby be prevented or at least delayed. The service life thereby increases of the rolling-element bearing ring 3 and thus also of the rolling-element bearing into which the rolling-element bearing ring is installed. The cross pattern of the trajectories 27, 28, which generates a corresponding geometry with respect to the course of the compressive residual stresses, has the consequence that no line exists along which the compressive residual stresses are constant. Instead, the compressive residual stresses vary in a location-dependent manner, so that there is no pronounced preferred direction, for example, for crack formation.

In contrast, for reasons of space the contact surface 6 is only machined with one tool 7. The tool 7 is disposed such that the tool tip 16 is pressed against the contact surface 6 in the radially inner end region of the contact surface 6 and guided radially outward over the contact surface 6. Here the tip carrier 15 is inclined in the advancing direction of the tool 7 in an analogous manner as described for the machining of the raceway 4. Due to this machining of the contact surface 6 a trajectory is generated on the contact surface 6, which has the shape of a spiral.

The invention claimed is:

1. A method for chipless machining of a surface region of a rolling-element bearing ring, the method comprising
setting the rolling-element bearing ring in rotation relative to two tools, which each include a tool tip, and
starting from different start positions at opposite axial ends of the rolling-element bearing ring, guiding the tool tips of the two tools over the surface region in opposite directions with respect to the surface region of the rotating bearing ring and pressing the tool tips against the surface region by a pressing force, so that on the surface region a helical or a spiral-shaped trajectory is formed by each tool tip such that the trajectories regionally overlap and cross each other multiple times in an overlap region.

2. The method according to claim 1, wherein the start positions are offset by 180° to each other with respect to the rotation of the rolling-element bearing ring.

3. The method according to claim 1, wherein at least one of the start positions is disposed relative to the rotation of the rolling-element bearing ring in a radial and/or axial end region of the surface region.

4. The method according to claim 1, wherein the start positions are mutually opposing, relative to the rotation of the rolling-element bearing ring, and are located at radial and/or axial end regions of the surface region.

5. The method according to claim 1, wherein the trajectories are not-overlapping in sections.

6. The method according to claim 1, wherein the overlap region extends at least over a main loading zone of the surface region, wherein a load ratio, which is defined as a ratio of a load occurring at any location to a maximum occurring load in the entire surface region, has at least one predetermined minimum value throughout.

7. The method according to claim 6, wherein the start positions of the tool tips of the two tools each fall outside the main loading zone.

8. The method according to claim 1, wherein
the tool tip of at least one of the two tools contactingly abuts on the surface region of the rolling-element bearing ring during machining of the rolling-element bearing ring,
the pressing force acts along a force direction, and
in an advancing plane, which is spanned by a surface normal in a contact zone oriented perpendicular to the surface region, and an advancing direction, in which the tool is moved, the force direction is inclined towards the advancing direction and encloses an angle of at least 2° with the surface normal.

9. The method according to claim 1, wherein the tool tip of at least one of the two tools is moved with a speed of 0.05 mm/revolution to 0.15 mm/revolution.

10. The method according to claim 1, wherein the surface region has a path speed of 50 m/min to 150 m/min.

11. The method according to claim 1, wherein the tool tip of at least one of the two tools is pressed against the surface region with a pressing force of 200 N to 750 N.

12. The method according to claim 1, wherein a film made from a cooling- and/or lubricating-medium is formed in the advancing direction of the tool and in the rotation direction of the rolling-element bearing ring in front of the tool tip on the surface region of the rolling-element bearing ring.

13. The method according to claim 1, wherein after the chipless machining the surface region is honed or subjected to a vibratory finishing treatment.

14. The method according to claim 1, wherein,
the start positions are offset from one another by 180 degrees,
a first one of the start positions is located at a first axial end of the rolling-element bearing ring and a second one of the start positions is located at a second axial end of the rolling-element bearing ring,
the trajectories include non-overlapping portions,
the overlap region extends at least over a main loading zone of the surface region and the first one of the start positions is outside the main loading zone,
the tool tip of at least one of the two tools is moved with a speed of 0.05 mm/revolution to 0.15 mm/revolution, and
the surface region has a path speed of 50 m/min to 150 m/min.

15. The method according to claim 1,
wherein the tool tip of a first one of the two tools engages the surface region at a first contact point,
wherein the pressing force of the first one of the two tools acts along a force direction, and the first one of the two tools advances in an advancing direction different than the force direction, and
wherein the force direction makes an angle of at least 2° with a surface normal at the contact point.

16. A method for chipless machining of a surface region of a rolling-element bearing ring, the method comprising:
rotating the rolling-element bearing ring relative to a first tool having a first tool tip and a second tool having a second tool tip;
positioning the first tool tip at a start position at a first axial end of the surface region of the rolling-element bearing ring;
positioning the second tool tip at a start position at a second axial end of the surface region of the rolling-element bearing ring opposite the first axial end;
moving the first and second tools in opposite axial directions such that the first tool tip follows a first helical or spiral path on the surface region and the second tool tip follows as second helical or spiral path on the surface region, the first and second paths crossing at multiple points within an overlap region located between axial ends of the surface region,
wherein the overlap region extends at least over a main loading zone of the surface region, and
wherein the first start position and the second start position are outside the main loading zone.

17. The method according to claim 16,
wherein the first tool tip engages the surface region at a contact point,
wherein the pressing force acts along a force direction, and the tool advances in an advancing direction different than the force direction, and
wherein the force direction makes an angle of at least 2° with a surface normal at the contact point.

* * * * *